United States Patent [19]
Bullock

[11] Patent Number: 5,149,508
[45] Date of Patent: Sep. 22, 1992

[54] PARALLEL PATH CATALYTIC CONVERTER
[75] Inventor: Wesley P. Bullock, Windham, Ohio
[73] Assignee: W. R. Grace & Co.-Conn., New York, N.Y.
[21] Appl. No.: 759,967
[22] Filed: Sep. 16, 1991

Related U.S. Application Data
[63] Continuation of Ser. No. 319,575, Mar. 6, 1989, abandoned.

[51] Int. Cl.$^5$ ............................................. F01N 3/10
[52] U.S. Cl. ................................. 422/174; 422/180; 422/190; 422/193; 422/199; 422/222; 55/146; 55/150; 55/DIG. 30; 60/300; 392/479
[58] Field of Search ............... 422/174, 180, 190, 191, 422/189, 193, 198, 199, 211, 222, 177; 55/146, 150, DIG. 30; 60/299, 300, 303; 392/479

[56] References Cited
U.S. PATENT DOCUMENTS

| | | | |
|---|---|---|---|
| 3,768,982 | 10/1973 | Kitzner et al. | 23/288 F |
| 3,770,389 | 10/1973 | Kitzner et al. | 23/288 F |
| 4,456,186 | 6/1984 | Ando | 422/199 X |
| 4,711,009 | 12/1987 | Cornelison et al. | 29/157 R |
| 4,911,894 | 3/1990 | Retallick et al. | 422/180 X |
| 4,976,929 | 12/1990 | Cornelison et al. | 60/300 X |

Primary Examiner—Lynn M. Kummert
Attorney, Agent, or Firm—Edward J. Cabic

[57] ABSTRACT

There is provided an electrically heatable catalytic monolith composed of a bundle of layers of corrugated thin metal strips in contiguous relation in an electrically parallel circuit, the bundle being accordion folded and having electrical contacts at each end of the bundle and insulation between contiguous folds of the bundle. There is also provided a catalytic converter having a housing, a nonelectrically heatable catalytic monolith and an electrically heatable catalytic monolith as above described in tandem relation in the housing. The primary purpose of the devices hereof is to enable preheating of the catalyst to near optimum temperature for catalytic treatment of a gas, e.g. exhaust gas from an internal combustion engine, to overcome pollution at the time of start-up of the engine and until equilibrium temperature of the unit is achieved.

27 Claims, 3 Drawing Sheets

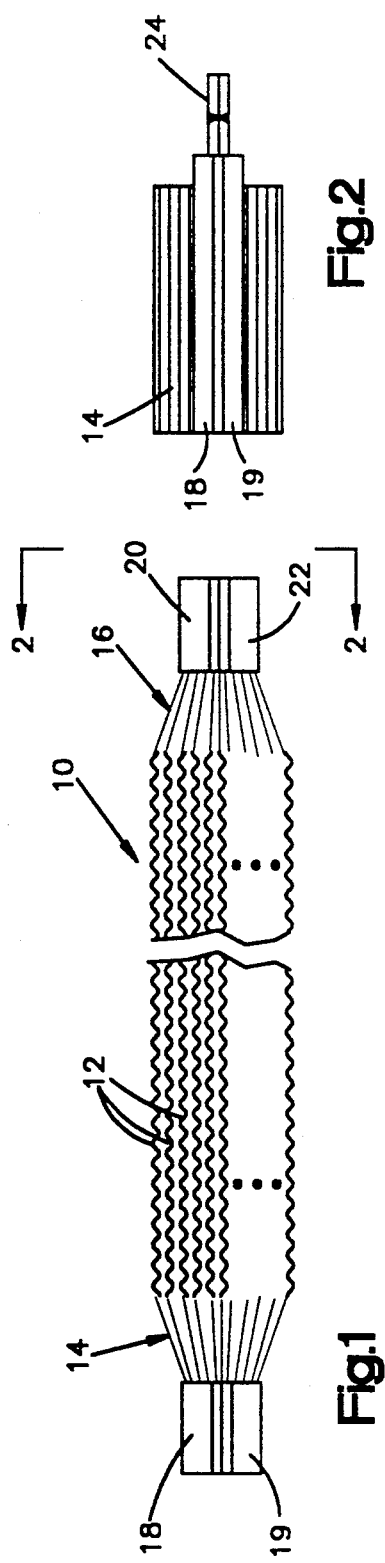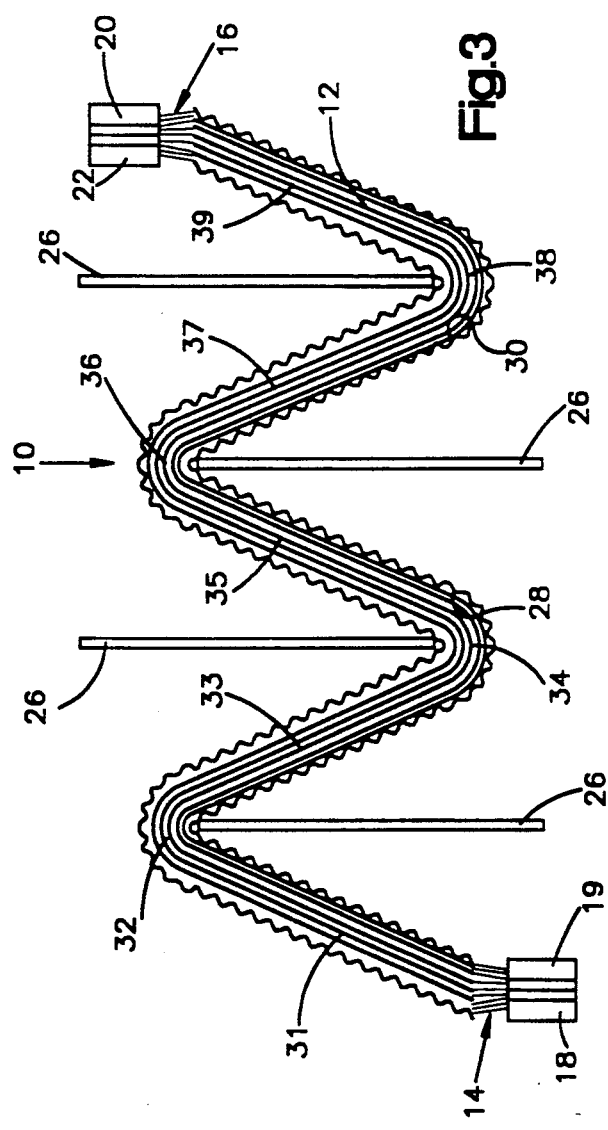

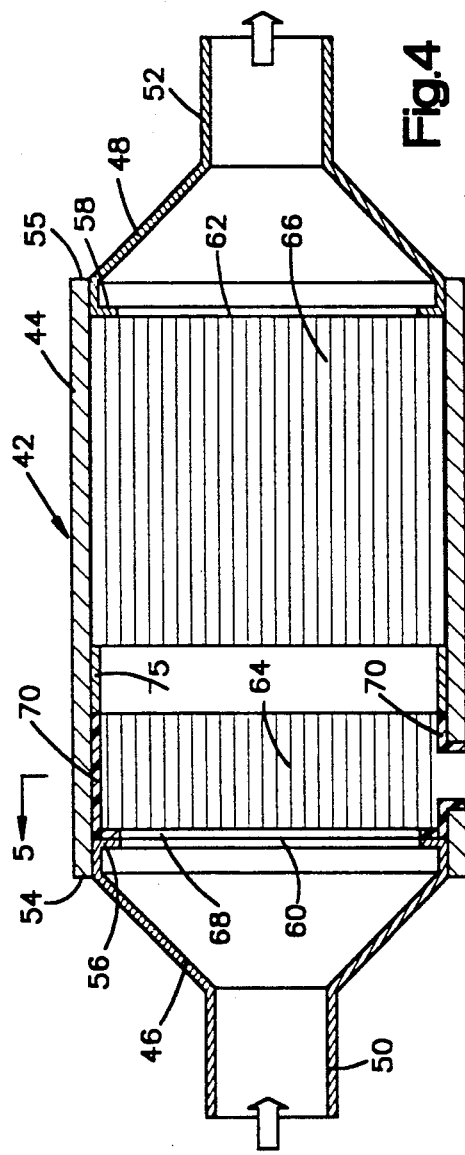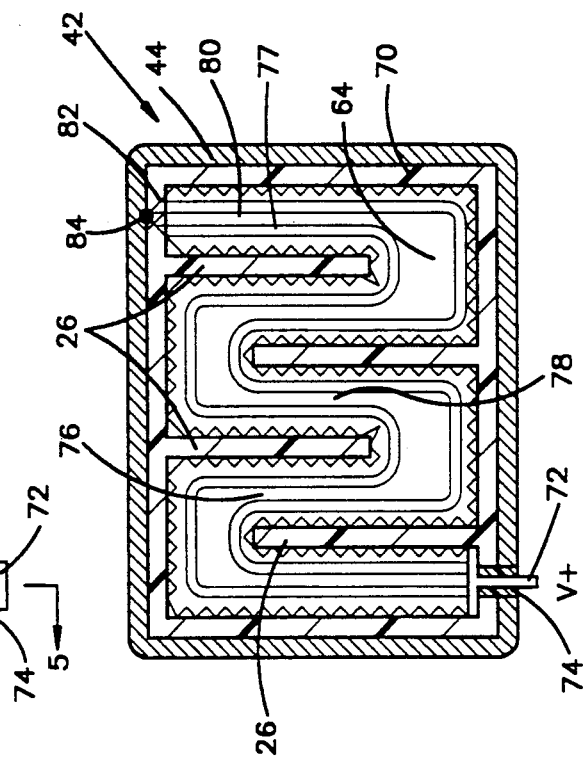

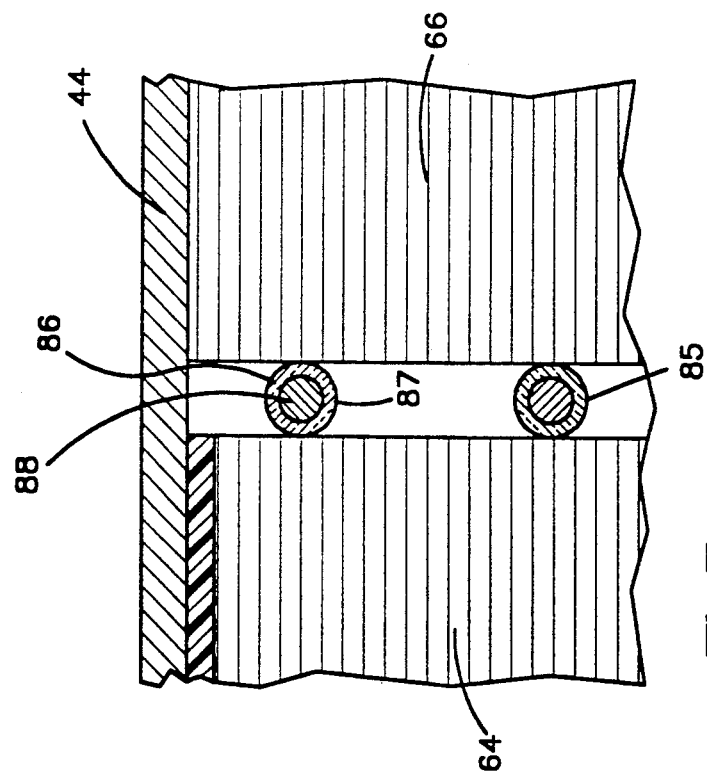
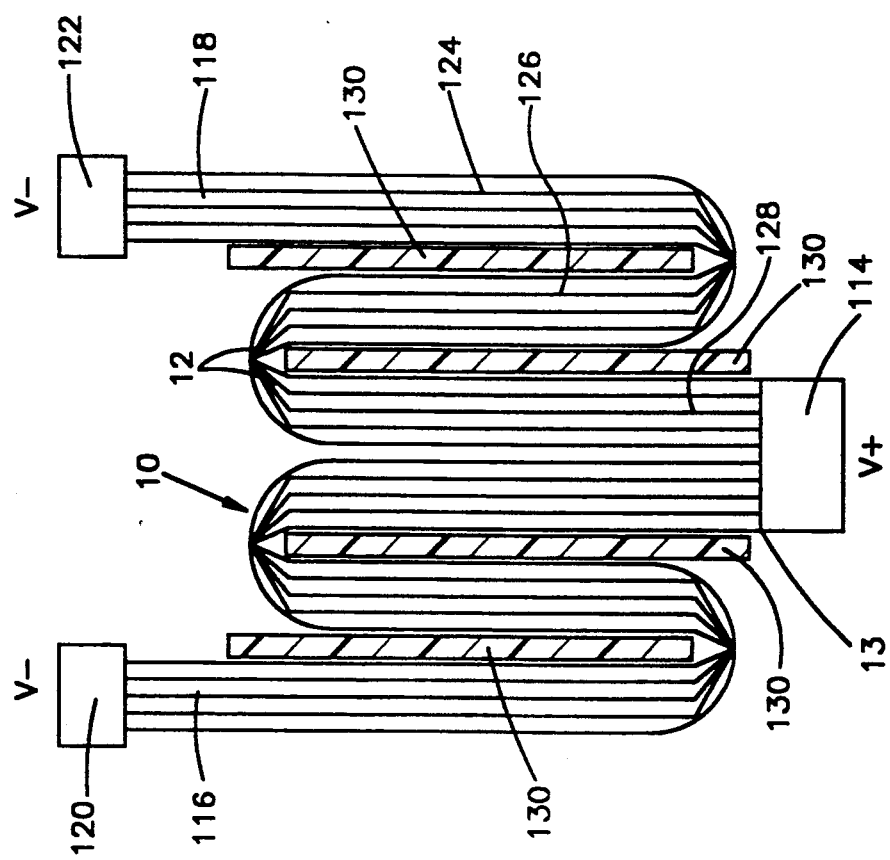

PARALLEL PATH CATALYTIC CONVERTER

This is a continuation of application Ser. No. 319,575, filed Mar. 6, 1989, now abandoned.

This invention relates, as indicated, to a catalytic converter, or a particulate trap, especially one useful in connection with an internal combustion engine, e.g. a catalytic converter for an automobile. These devices are characterized by the ability to be electrically heated, at least in part. The principal purpose of a catalytic converter is to convert ingredients in a gas stream, particularly pollutants in an exhaust gas stream, to different chemical compounds, particularly those which are environmentally acceptable.

The invention relates more particularly, to an electrically heated metal honeycomb core whereby the core is heated to a temperature more favorable to catalytic action. This feature is especially beneficial at the time of start-up of an internal combustion engine when the catalytic converter associated therewith is at a temperature below that needed for the adequate conversion of pollutant material to harmless, environmentally acceptable gases.

The invention can also be used to convert methanol to hydrogen and carbon monoxide so that the resulting gas is easy to combust. Primary pollutant materials in automotive exhaust include carbon monoxide, nitrogen oxides, volatile organic compounds, e.g., unburned hydrocarbons, and carbon particulates. These materials can be converted or removed from the exhaust stream to an acceptable extent by the devices embodying this invention.

BACKGROUND OF THE INVENTION AND PRIOR ART

Conventional catalytic converters utilize a ceramic monolith on which is deposited a catalyst which aids in the conversion of pollutants such as, carbon monoxide, nitrogen oxides ($NO_x$), unburned hydrocarbons, etc. to carbon dioxide, water and nitrogen. However, this conversion is not efficient initially while the exhaust gases are relatively cold. To be effective at a high conversion rate, the catalyst, e.g., palladium, and surfaces with which the exhaust gases come in contact must be at a minimum elevated temperature; for example, 350° F. for carbon monoxide and 570° F. for volatile organic compounds. The "light off" or conversion temperatures will depend on the catalyst and contact area. Otherwise, the conversion of these pollutants to harmless by-products is low and cold-start pollution of the atmosphere is high. Once the exhaust system comes to its normal operating temperature, the catalytic converter is effective. Hence, it is to the achievement of early conversion of pollutants before reaching normal operating temperature and while low exhaust temperatures are encountered that the present invention is primarily directed. This invention provides a novel structure for an electrically heatable element in a catalytic converter, and a novel catalytic converter characterized by the presence of such an element.

The principle of elevating the temperature of a catalytic converter to a higher, more efficient operating temperature for start-up is not, per se, new. Reference may be had to U.S. Pat. No. 3,768,982 to Kitzner dated 30 Oct. 1973. In this patent, heat from a centrally located electric heater is transferred by conduction through a monolithic catalyst support to heat the catalyst to an optimum operating temperature. Reference may also be had to U.S. Pat. No. 3,770,389 to Kitzner dated 30 Oct. 1973 which discloses a central electrically heated core within a ceramic monolith, heat being transmitted by conduction to the catalyst contained in the openings of the ceramic monolith. The heating core is formed of metal sheets, one flat and the other corrugated, coated with alumina and also bearing a catalyst. The metallic core is heated electrically by virtue of its own electrical resistance.

Reference may also be had to the copending application of Cornelison et al Ser. No. 196,301, filed 20 May 1988 for discussion of an electrically heated catalytic core formed of corrugated thin metal strips having an aluminum oxide coating on the surface thereof.

Reference may also be had to the U.S. Pat. of Cornelison and Retallick, No. 4,711,009 dated 8 Dec. 1987 for details of the preparation of corrugated alumina coated thin metal strips having a catalyst deposited thereon. This patent is incorporated herein by reference thereto. Such strips may be utilized in the present invention.

The structures of the present invention are distinguished from the prior art in that the latter rely on a single corrugated thin metal strip, which is preferably accordion folded, to build up a metal monolith which is then inserted into a suitable housing. The devices of the present invention are formed of a plurality of strips electrically in parallel and secured at the ends thereof to suitable electrical contacts, and the entire unit formed to fit together with needed insulation into a suitable housing. In a preferred structure, a plurality of strips about 1" wide and 14" to 20" long, corrugated, wash coated with alumina, dried, and catalyst applied, are collected, stripped at each end of wash coat, and provided at each end with an electrical contact. This example is designed for a 12 volt battery system. The whole assembly is then folded, preferably in an accordion fold, an insulator disposed between contiguous reaches of the fold to prevent shorting or welding, and then placed in a suitable housing.

This structure is particularly advantageous in enabling the entire unit to draw sufficient power from a 12 volt or 24 volt automotive system to bring the monolith to a desired temperature e.g., 600° F., very quickly. Because of the parallel path, all touching points of the layers are at nearly the same potential and shorting between touching contiguous layers is avoided. The plural paths enable the device to draw more power than prior devices without shorting and to achieve a higher temperature more quickly. Thus, the unit is capable of accomplishing the desired preliminary temperature elevation to catalyst operating temperature until such time as the exhaust is able to heat, and oftentimes maintain, the entire converter at optimum operating temperature.

BRIEF STATEMENT OF THE INVENTION

Briefly stated, the present invention is an electrically heatable catalytic converter comprising in combination (a) a stainless steel housing; (b) at least one bundle of layers of corrugated thin metal, e.g., stainless steel or ferritic stainless steel, having a catalyst on at least one surface of each strip, and the bundle being folded, preferably accordion folded, and disposed in the housing; (c) electrical contact means secured to each end of the bundle for connection to positive and negative poles of a voltage source; and (d) high temperature resistant insulation means for isolating the bundle from the housing.

BRIEF DESCRIPTION OF THE DRAWINGS

The invention may be better understood by having reference to the annexed drawings showing a preferred embodiment of the invention and wherein:

FIG. 1 is a side view of a bundle of layers of corrugated thin metal gathered at the ends and with electrical contacts attached.

FIG. 2 is an end view of the bundle shown in FIG. 1 with a projecting terminal for attachment to a voltage source, not visible in FIG. 1.

FIG. 3 is a side view of the bundle shown in FIG. 1 accordion folded and with insulation disposed between contiguous reaches of the folds to prevent shorting between portions of the layer at different potential.

FIG. 4 is a cross-sectional view of a catalytic converter showing an electrically heatable monolith of the present invention at the upstream end of the converter and a nonheated catalytic monolith at the downstream end.

FIG. 5 is a cross-sectional view of a converter in accordance with the present invention as it appears in the plane indicated by the line 5—5 in FIG. 4, wherein the monolith has been compacted for inclusion in a catalytic converter of rectangular configuration.

FIG. 6 is like FIG. 3 and shows another method of folding the bundles of layers of corrugated thin metal foil.

FIG. 7 is a fragmentary cross-sectional view of a catalytic converter like that shown in FIG. 4, but showing a different retaining and spacer means between the electrically heatable monolith and the nonheatable monolith.

DETAILED DESCRIPTION OF THE DRAWINGS

As indicated above, the present invention contemplates a plurality of corrugated thin metal layers and having electrical contacts secured to each end of the bundle of individual layers. Because the ends of the layers are connected to common terminals at the ends of the bundle, the structure is denominated a "parallel path" device. The corrugation patterns are preferably generally sinusoidal in cross-section and have a herringbone or chevron pattern between the marginal edges of the thin metal strip. In general, the corrugations have an amplitude of from about 0.02" to about 0.25" and a pitch or wave length of from about 0.02" to about 0.2". In the chevron pattern, the angle of deviation of the sides of the chevron from a line normal to the marginal edges of the strip is from about 3 degrees to about 10 degrees, i.e., the included angle defined by the chevron pattern is from about 160 degrees to about 176 degrees. The length of a side of the chevron is about 0.75" to about 1.25". The chevron pattern is formed by passing the thin metal strip between corrugating gears from a leading edge of the strip to the trailing edge. The "thin" metal has a thickness generally in the range of from 0.001" to about 0.05", 0.002" being a preferred thickness. The individual strips have a width of from about 0.75" to about 2.5". The thin metal also may have a thin coating of aluminum on the surfaces thereof as applied by the steel manufacturer. During heat treatment, this aluminum metal coating is at least partially converted to alumina, a desired catalyst support base. Alternatively, the stainless steel may contain aluminum metal as a part of the alloy composition, and submission of the strip to heat in an oxidizing atmosphere will create a very thin layer of aluminum oxide on the surfaces thereof. Other metal oxides can be used for this application, e.g., silica, zirconia, titania, etc.

The preferred metal alloy from which the corrugated thin metal layers are made is a ferritic stainless steel such as that described in U.S. Pat. No. 4,414,023 dated 8 Nov. 1983 to Aggen et al. Specific alloys consist essentially of chromium 8.0%–25.0% chromium, 3.0%–8.0% aluminum, 0.002%–0.05% of at least one rare earth metal selected from cerium, lanthanum, neodymium and praseodymium, the total of all rare earths up to 0.060%, up to 4.0% silicon, 0.06%–1.0% manganese and normal steel making impurities of less than 0.05% carbon, less than 0.050% nitrogen, less than 0.020% oxygen, less than 0.040% phosphorus, less than 0.030% sulfur, less than 0.50% copper, less than 1% nickel, the sum of calcium and magnesium being less than 0.005%, the remainder being iron. The desired procedure is to corrugate the metal strip and then apply a wash coat of alumina according to known procedure. (See U.S. Pat. No. 4,711,009, supra).

The preferred ferritic stainless steel of the present invention has an electrical conductivity of about 16000 $(ohm-inch)^{-1}$. The maximum current that can realistically be drawn on a 12 volt system is about 200 amps. A 24 volt system will yield twice as much power at the same amperage.

The individual layers of corrugated thin metal are superimposed one on top of the other so as to be in nonnesting albeit contacting relation. This is conveniently achieved by reversing or turning over every other layer before superimposition on the previous layer. By this expedient, the angles including the apices of the chevron pattern will be reversed in succeeding layers and nesting thus prevented.

The bundles of layers of from 10 to 20 individual strips with the ends stripped of washcoat, are gathered together, aligned, and connected at the ends to electrical contacts. This may be accomplished by welding individual strips to an electrical contact or by compressing the metallic ends between strips forming an electrical contact and welding the strips and layers together. One end of the bundle may be attached directly to the metal container or housing (usually the negative or ground pole) and the other to terminal means extending through the housing and insulated therefrom for attachment to the positive pole.

Referring now, more particularly, to FIGS. 1 and 2, FIG. 1 shows in side elevation a bundle 10 composed of a series of layers 12. In a specific embodiment, each of the layers is 16.25" long by 1.0" wide, and is formed of ferritic stainless steel alloy containing 20% chromium, 0.06% rare earths, 4% aluminum, balance iron and normal steel making impurities. There are 12 layers in parallel in such an embodiment. As shown in FIG. 1, the individual layers 12 are compressed at each end 14 and 16 and captured between electrode forming members 18 and 19 as by bolting together or welding. FIG. 2 shows the electrode portion of the left end of the strip as shown in FIG. 1. As designated in FIG. 2, this electrode with a projecting member 24 is adapted for connection to the positive pole of a battery. The member 24 is adapted to extend through the housing (not shown) with a suitable ceramic sleeve insulator, such as shown in FIG. 4. The electrode 20, 22 (FIG. 1) is the negative terminal and may be attached directly to the housing.

FIG. 3 shows a bundle 10, such as shown in FIG. 1, which has been partially accordion folded. Strips of high temperature resistant insulation 26 are inserted between the confronting surfaces or reaches, such as reaches 28 and 30. The insulation is desirably a ceramic cloth commercially available as NEXTEL or INTERAM. These sheets are conveniently from about 0.02" to 0.2" thick. Alternatively, a sleeve of ceramic cloth surrounding a flat metal strip may be used as the insulator element 26. The assembly of FIG. 3 is further compressed as shown in FIG. 5 for insertion in the housing 44 (FIG. 5).

It will be noted that there is an even number of "180 degree" bends 32, 34, 36, and 38 for the bundle 10 and an odd number of reaches 31, 33, 35, 37, and 39 of the same length. This assures that all the layers 12 can be of the same length and provide the same voltage drop even though accordion folded.

FIG. 4 is a cross-sectional view of a rectangular catalytic converter 42 for an automobile. The height of the housing 44 should not be more than about 3.5". The width of the housing 44 may be about 6" and the length about 8" to 12". The housing 44 is provided with suitable flared end caps 46 and 48 having nipples 50 and 52 adapted to receive ends of an exhaust pipe, not shown. The end caps 46 and 48 may be welded to the housing 44. Immediately inside the housing 44 ends 54 and 55, respectively, there is provided a retainer 56 and 58, respectively, each having an L-shaped cross-section, and being adapted to butt against the respective outer ends 60 and 62 of the monoliths 64 and 66, respectively.

The monolith 64 is an electrically heatable catalytic monolith such as that shown in FIGS. 1, 2, and 3. A suitable steel retainer plate 68 having openings therein to admit an exhaust gas stream into the converter 42 is provided at the upstream end 54. The monolith 64 is electrically isolated from the housing 44 by insulation, such as ceramic cloth 70 as above described. The end 14 (FIG. 1) of the electrically heatable monolith 10 is not shown in FIG. 4, but may be attached to the housing 44 which is in turn connected to the negative pole of the automobile battery through a ground strap attached to the frame. Alternatively, the end 14 may be fitted with a ceramic sleeve and stainless steel rod insert and extended through the housing 44 for attachment to the negative pole. The other terminal 20, 22 in FIG. 1 is shown as electrode 72 in FIG. 4 extending from the monolith 64 through the insulation layer 70 and the steel housing 44. The electrode 72 is electrically isolated from the housing 44 by insulation member 74. Electrode 72 is attachable to the positive pole of the battery (not shown) through suitable controls which enable control of the current flow to the electrically heatable monolith 64. As indicated above, electric power needs to be applied at the time of a cold start to bring the monolith up to optimum operating temperature. After that condition has been achieved, the heat of the exhaust and the combustion of pollutants will generally maintain the temperature of the converter 42 at the proper point, and the battery source may be disconnected by any suitable means, manual or electronic. In very cold weather, it may be found desirable to electrically heat the catalyst all the time in order to maintain the desired catalyst temperature.

In FIG. 4, the electrically heatable monolith 64 is shown in a position upstream of the nonelectrically heatable monolith 66. The monolith 64 may be located downstream of the monolith 66. In this case, the monolith 66 during operation serves to remove materials, e.g. sulphur, which could otherwise adversely affect the catalyst in the electrically heatable monolith 64.

The converter 42 also includes a nonelectrically heated monolith 66. This monolith is a series of layers of corrugated thin metal of the same type as used in forming the electrically heatable unit. The thin metal, normally a stainless steel, e.g., a ferritic stainless steel, is corrugated as described in the aforesaid U.S. Pat. No. 4,711,009 supra, and layered, either by accordion folding or by laying up a series of corrugated thin metal strips in alternating fashion, so that the pile is nonnesting; that is, the corrugations of one layer do not mesh or nest in the corrugations of the contiguous layer and thus "blind" the monolith to the passage of gas therethrough. The corrugations may have the same chevron pattern and be of the mixed flow type whereby the gas passing through the monolith follows a tortuous path through the cells of the monolith.

The monolith 66 is spaced from the monolith 64 by a suitable steel spacer 75 welded or otherwise suitably attached to the interior periphery of the housing 44, and against which both the monoliths 64 and 66 abut. The combination of the spacer 75 with the end retainers 56 and 58 holds the monoliths in place and prevents axial displacement of the layers due to high gas speed and pulsations emanating from the engine. FIG. 7 shows another means for retaining the monoliths 64 and 66.

The monoliths 64 and 66 may have the same or different cell densities. Generally, the same cell densities may be used. Cell density ranges from a low of about 50 cells per square inch to as high as 700 cells per square inch. For most purposes, a cell density of 150 to 400 cells per square inch is sufficient.

Although the nonelectrically heatable monolith 66 has been described above as a corrugated thin metal monolith, this monolith may be replaced with a ceramic monolith of conventional structure and adapted to fit within a rectangular or oval housing.

FIG. 5 shows a front cross-sectional view of the electrically heatable monolith 64 in the housing 44 as it appears in the plane indicated by the line 5—5 in FIG. 4. In this view, the electrically heatable monolith 64 is tightly accordion folded in contrast to FIG. 3 and provided with ceramic insulators 26 between the reaches 76 and 78 for example, to keep them electrically isolated. Ceramic insulator 70 between the monolith 64 and the housing 44 is also shown. FIG. 5 also shows the electrode 72, electrode 72 extending through the housing 44 with a ceramic sleeve 74 and being adapted for connection to the positive pole. The fifth reach 80 is gathered at its upper end 82 and may be welded to the housing 44 as at 84 to complete the electrical circuit for indirect connection to the negative or ground pole of the vehicle.

FIG. 6 shows another mode for folding a bundle 10. Here, the bundle 10 (FIG.1) is cut in equal sections. The free ends 13 of the layers 12 are secured as by welding to a common terminal 114 which becomes the positive terminal. Each half bundle 10 is then folded as shown each providing three reaches 124, 126 and 128 of bundled layers of corrugated thin metal strips. The remaining ends 116 and 118 are provided, as shown for example, in FIG. 1, with electrical contacts 120 and 122 for attachment to the negative pole of a voltage source. Insulation strips 130 are inserted between the reaches, e.g. reaches 124 and 126. This arrangement has as one advantage the elimination of a rather bulky turn at the center of the bundle and enables the use of a housing of smaller dimension.

As indicated above, FIG. 7 shows another means for retaining the monoliths 64 and 66 in stable and spaced relation. In FIG. 7, there are provided across the length of and behind the electrically heatable monolith 64 a pair of spaced retainers 85 and 87 extending between the sides of the housing 44. The spacer 87, for example, is formed of a ceramic sleeve 86 surrounding a stainless steel rod 88. The ceramic sleeve is formed of alumina 99.8% plus traces of other metal oxides. These sleeves are commercially available and commonly used for thermocouple wells. The rod 88 is desirably slightly undersized for the bore through the sleeve to allow for expansion. The rod 88 may be wrapped with a ceramic cloth to serve as a shock absorber.

What is claimed is:

1. An electrically heatable catalytic converter comprising in combination (a) a stainless steel housing; (b) at least one bundle of contiguous nonnesting layers of corrugated thin stainless steel strips, each of said strips having a metal oxide coating and a catalyst on at least one surface, and said at least one bundle being folded and disposed in said housing; (c) ceramic cloth insulation disposed between contiguous reaches of said at least one folded bundle; (d) electrical contact means secured to each end of said at least one bundle for connection to positive and negative poles of a voltage source; and (e) high temperature resistant insulation means for isolating said at least one bundle from said housing.

2. An electrically heatable catalytic converter in accordance with claim 1 wherein the stainless steel strips are formed of a ferritic stainless steel alloy.

3. An electrically heatable catalytic converter in accordance with claim 2 wherein the ferritic stainless steel alloy comprises chromium, rare earth metal, aluminum and iron.

4. An electrically heatable catalytic converter in accordance with claim 2 wherein the ferritic stainless steel alloy comprises 8.0 to 25% chromium, 3.0 to 8% aluminum, 0.002 to 0.06% of a rare earth metal selected from the group consisting of cerium, lanthanum, neodymium and praseodymium, the total of all rare earth metals ranging up to 0.06%, up to 4% silicon, 0.06 to 1% manganese and the balance iron and normal steel making impurities.

5. An electrically heatable catalytic converter in accordance with claim 1 wherein the strips have corrugations which are in a chevron or herringbone pattern.

6. An electrically heatable catalytic converter in accordance with claim 1 wherein each said at least one bundle is composed of from 10 to 16 individual layers.

7. An electrically heatable catalytic converter in accordance with claim 1 wherein the width of each strip is from 0.75" to 2.5".

8. An electrically heatable catalytic converter in accordance with claim 1 wherein the insulation between the reaches is ceramic insulation.

9. An electrically heatable catalytic converter in accordance with claim 1 wherein the insulation between the reaches is a ceramic rope.

10. An electrically heatable catalytic converter in accordance with claim 1 wherein the catalyst is supported on an alumina layer adhered to the stainless steel strips.

11. An electrically heatable catalytic converter in accordance with claim 1 wherein the catalyst is a noble metal.

12. An electrically heatable catalytic converter in accordance with claim 1 wherein the catalyst is selected from the group consisting of platinum, palladium, rhodium, ruthenium, and mixtures thereof.

13. An electrically heatable catalytic converter in accordance with claim 12 wherein the catalyst is palladium.

14. An electrically heatable catalytic converter in accordance with claim 12 wherein the catalyst is platinum.

15. An electrically heatable catalytic converter in accordance with claim 1 wherein catalyst is disposed on both surfaces of each corrugated thin stainless steel strip.

16. An electrically heatable monolith comprising in combination (a) an accordion folded bundle of contiguous layers of corrugated thin stainless steel strips in nonnesting relation, and having a catalyst on at least one surface of each strip in said bundle; and (b) electrical contact means at each end of said bundle for connection to positive and negative poles of a voltage source.

17. An electrically heatable catalytic monolith in accordance with claim 16 wherein the stainless steel strips are a ferritic stainless steel.

18. An electrically heatable catalytic monolith in accordance with claim 16 wherein the stainless steel strips have a thin coating of alumina on the surfaces thereof.

19. An electrically heatable catalytic monolith in accordance with claim 18 wherein the catalyst is disposed on said alumina coating.

20. An electrically heatable catalytic monolith in accordance with claim 16 wherein the corrugated thin stainless steel strips have corrugations having a chevron or herringbone pattern.

21. An electrically heatable catalytic monolith in accordance with claim 16 wherein the corrugated thin stainless steel strips have corrugations having a pitch of from about 0.02" to about 0.2" and an amplitude of from about 0.03" to about 0.25".

22. An electrically heatable catalytic monolith in accordance with claim 16 wherein the stainless steel strips have a thickness of from about 0.001" to about 0.005".

23. A catalytic converter comprising in tandem relation (a) a catalytic monolith of corrugated thin stainless steel layers disposed in nonnesting relation and having an aluminum oxide coating on each side thereof on which is disposed a noble metal catalyst; a second monolith (B), said second monolith being an electrically heatable catalytic monolith comprising (a) an accordion folded bundle of contiguous layers of corrugated thin stainless steel strips folded into a plurality of reaches, each said strip having an aluminum oxide coating on each side thereof, and a noble metal catalyst deposited on the aluminum oxide coated sides thereof; (b) electrical contact means at each end of said bundle for connection to the positive and negative poles of a voltage source; and (c) insulation means for electrically isolating contiguous reaches of said accordion folded bundle; (C) a stainless steel housing for said monolith (A) and said second monolith (B), and (D) insulation means for electrically isolating said housing from said second monolith (B).

24. The catalytic converter of claim 23 further comprising a gas inlet through said housing (C) upstream of said electrically heatable catalytic monolith (B) and a gas outlet through said housing (C) downstream of said catalytic monolith (A).

25. The catalytic converter of claim 23 further comprising an electrical terminal electrically insulated from and extending through said housing (C) for connection to one pole of a voltage source.

26. The catalytic converter of claim 23 wherein the electrically heatable monolith (B) is located downstream of the monolith (A).

27. The catalytic converter of claim 23 wherein the electrically heatable monolith (B) is located upstream of the monolith (A).

* * * * *